Sept. 16, 1958     J. M. COGAR     2,851,941

BARBECUE TRUCK

Filed July 3, 1953

*INVENTOR.*
J. M. COGAR

BY

*F. D. Copeland Jr.*

AGENT

United States Patent Office 2,851,941
Patented Sept. 16, 1958

2,851,941

BARBECUE TRUCK

Joseph M. Cogar, Dallas, Tex.

Application July 3, 1953, Serial No. 365,927

1 Claim. (Cl. 99—259)

This invention relates generally to meat preparing devices, and has for its primary object to provide such a device that will bake, grill, barbecue, smoke or fry meat or other food as desired.

Another object of this invention is to provide a device of this character which transmits heat from the firebox to the main meat oven by means of conduction, convection, and radiation.

A still further object is to provide an oven in which true barbecuing or smoking may be accomplished selectively by merely turning simple controls.

And yet another object is to provide an oven in which barbecuing or smoking is readily accomplished without turning the meat, and in which the combustion products are made to pass slowly over and around the meat to insure uniform cooking.

These and other objects of this invention will become apparent from the following specification and drawing, in which.

Figure 1:
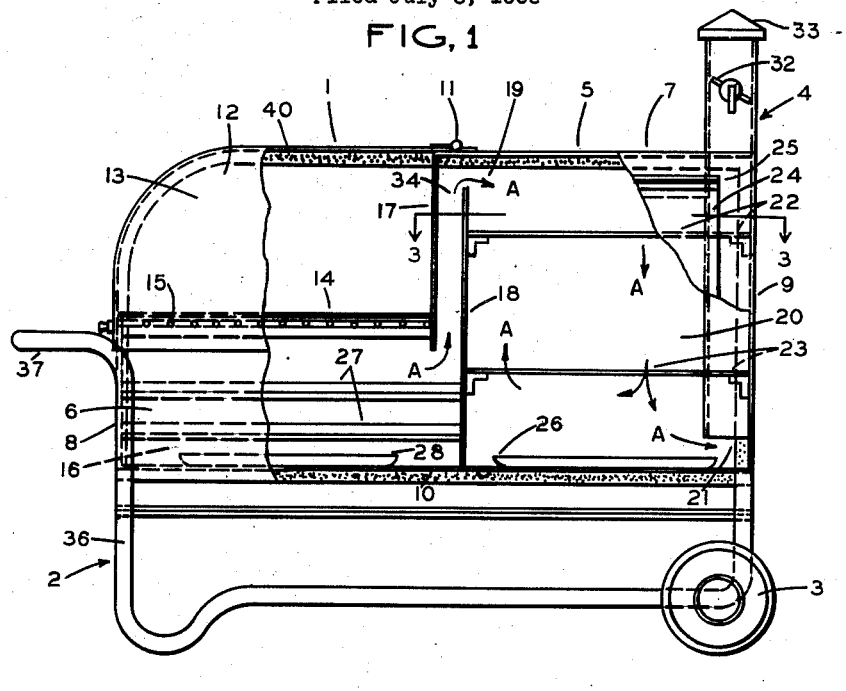
Fig. 1 is a side elevational view of the improved barbecue truck with a portion of the side wall removed for clarity of illustration.
Figure 2:
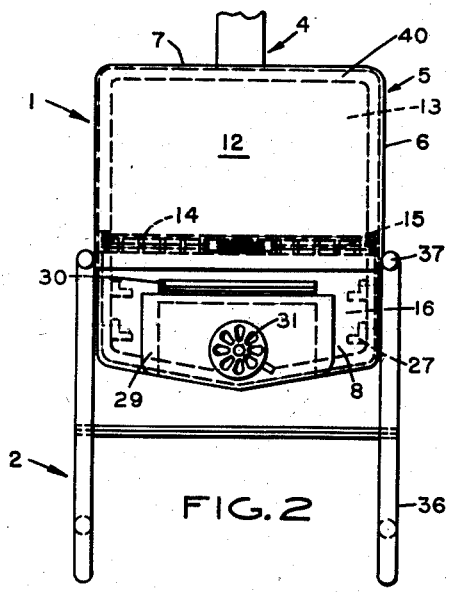
Fig. 2 is a left end view of the device of Fig. 1.
Figure 3:
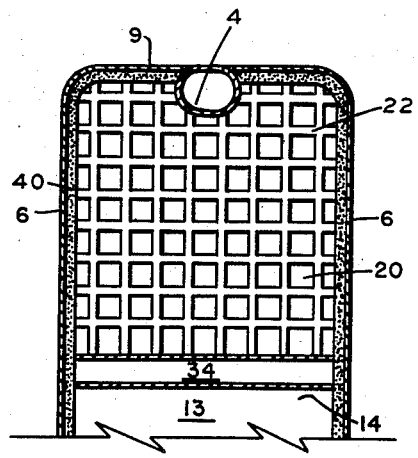
Fig. 3 is a fragmentary section taken along the lines 3—3 of Fig. 1.

Referring now more particularly to the characters of reference of the drawing, the complete barbecue truck is seen to consist basically of an oven body 1, supported on a carriage frame 2, having ground engaging wheels 3, and an upstanding flue 4.

The oven body includes an outer shell 5, having side walls 6, a top 7, ends 8 and 9, and a bottom plate 10. One corner section of shell 5 is hinged at 11 to form a pivoted hood 12 which, when shut, encloses a warming compartment 13 having a solid, but sliding bottom plate 14. Immediately below sliding plate 14 is a stationary grill 15, and a firebox 16 is directly under and open to the grill 15. The innermost end of warming compartment 13 is closed by a vertical wall 17 which runs transverse to side walls 6 and extends downward slightly below grill 15. A second transverse vertical wall 18 is parallel to and spaced a short distance from wall 17. Wall 18 terminates slightly below top 7 so that a smoke passage 19 is provided adjacent the inner side of top 7. Flue 4 is inserted in barbecue chamber 20 adjacent end 9 and extends downward to within a short distance of bottom plate 10 leaving a smoke passage 21 therebetween. Meat racks 22 and 23 are positioned horizontally in chamber 20 and are easily accessible through oven door 24 which is hinged at 25 to side wall 6. Drip pan 26 is also accessible and removable through door 24. Angles 27 are located in fire box 16 and are attached to the inner side of walls so that a charcoal pan 28 may be placed in several vertical positions within the fire box 16. Pan 28 is inserted through fire box door 29 which is hinged to end wall 8 as shown at 30.

An intake air control 31 is located in and is manually rotatable from the exterior of door 29, while damper 32 is rotatable from the exterior of flue 4. A vent hood 33 covers the top opening of flue 4 to prevent rain from entering flue 4 and also to prevent excessive draft in the flue during high winds. These latter controls and structure assist in regulating the air and smoke passage through the oven.

In operation, fuel is inserted through door 29 into fire box 16, either as wood, charcoal, or other combustible materials, and the meat to be prepared is placed in the desired location, as for example on rack 22, and if true barbecuing is desired, damper 32 is opened moderately, as is intake air control 31. When the fuel in fire box 16 is burning well, smoke and combustion products, indicated at A will rise through vertical channel 34 and will enter passage 19 to chamber 20 wherein the smoke will expand and fill the chamber before becoming restricted again at lower flue opening 21. As the smoke rises up flue 4 it may be again restricted at damper 32, before passing out hood 33 to the atmosphere. It will be observed that the restriction mentioned will cause the combustion products which have retained the bulk of their heat to bottle up in chamber 20 and actually increase the pressure in the chamber so that any meat on racks 22 or 23 will be heated from all sides without turning. The heat retained in products A is not dissipated during this process, since channel 34 is directly exposed to the fire box 16 and walls 17 and 18 are very hot during operation. Furthermore, heat from fire box 16 radiates through wall 18 to any meat on racks 22 and 23, and the walls and racks being metal will conduct heat to the meat being prepared.

The bulk of the exposed metal surface with which the combustion products A come into contact are already heated by radiation and conduction, and the remaining surfaces, such as top 7 and bottom plate 10 are insulated, so that the efficiency of this improved barbecue truck is near its maximum value. If a smoking operation is desired, damper 32 and control 31 are further closed, and a similar movement of smoke results, but in this instance, at a much slower rate. Warming compartment 13 may be converted into a grill for grilling or frying meat by lifting hood 12 and removing sliding plate 14.

Carriage 2 may be formed of two pieces of tubing 36 by bending and attaching to the oven body as shown. Wheels 3 are journalled to the lower forward end of tubing 36, and this construction will permit the entire unit to be pushed by raising slightly on handles 37.

From the foregoing description, it will be readily seen that there has been produced a device which substantially fulfills the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described the invention, the following is claimed as new and useful, and upon which Letters Patent is desired:

A meat preparing oven, comprising: a shell having side walls, enclosing a firebox, a warming oven section within said shell, an end wall on said section extending rigidly from the top of said shell to a point in said firebox below said section and extending transversely between said side walls, a fire box directly below said warming oven, a second wall parallel to said end wall and extending between said side walls, said second wall terminating short of said top whereby a smoke channel is formed between said walls, a cooking chamber on the opposite side of said channel from said warming oven, an open mesh meat rack intermediate the top and bottom of said chamber whereby meat placed on said rack will be exposed on all sides, a flue extending into said chamber at the opposite side from said channel, said flue opening to the interior of said chamber near the bottom thereof whereby combustion products from said fire box will rise directly up said smoke channel into said chamber, downward through said chamber, into said flue opening at the bottom of said chamber, and up said flue to the atmosphere.

References Cited in the file of this patent

UNITED STATES PATENTS

| | | |
|---|---|---|
| 416,238 | Roberts | Dec. 3, 1889 |
| 717,242 | Mettler | Dec. 30, 1902 |
| 1,040,451 | Stockton | Oct. 8, 1912 |
| 1,328,071 | Baldwin | Jan. 13, 1920 |
| 1,999,515 | Muenzer | Apr. 30, 1935 |
| 2,143,999 | Rosson | Jan. 17, 1939 |
| 2,307,914 | Bitney | Jan. 12, 1943 |
| 2,600,234 | Foley | June 10, 1952 |
| 2,626,559 | Rau | Jan. 27, 1953 |
| 2,666,425 | Hastings | Jan. 19, 1954 |